United States Patent [19]

Pearce

[11] Patent Number: 5,694,582
[45] Date of Patent: Dec. 2, 1997

[54] OPERATION SYSTEM INDEPENDENT POLLED INTERFACE FOR EXTENSION BIOS (XBIOS) OPERATIONS

[75] Inventor: John J. Pearce, Austin, Tex.

[73] Assignee: Dell USA, LP, Round Rock, Tex.

[21] Appl. No.: 592,503

[22] Filed: Jan. 26, 1996

[51] Int. Cl.$^6$ .................................................. G06F 9/46
[52] U.S. Cl. ..................... 395/500; 395/185.04; 395/186
[58] Field of Search ........................... 364/200; 340/723; 395/500, 700, 652, 185.04, 186

[56] References Cited

U.S. PATENT DOCUMENTS

| | | | |
|---|---|---|---|
| 5,008,816 | 4/1991 | Fogg, Jr. et al. | 364/200 |
| 5,062,042 | 10/1991 | Binkley et al. | 364/200 |
| 5,088,033 | 2/1992 | Binkley et al. | 395/500 |
| 5,119,081 | 6/1992 | Ikehira | 340/723 |
| 5,291,585 | 3/1994 | Sato et al. | 395/500 |
| 5,564,054 | 10/1996 | Brammick et al. | 395/700 |
| 5,586,324 | 12/1996 | Sato et al. | 395/652 |
| 5,590,312 | 12/1996 | Marisetty | 395/500 |

OTHER PUBLICATIONS

Popescu, V., et al., "The Metaflow Architecture", 1 Jun. 1991, pp. 10–13, 63–73, IEEE Micro., vol. 11, No. 3, XP000237231.

Torng, H.C., et al., "On Instruction Windowing for Fine Grain Parallelism in High–Performance Processors", 23 Mar. 1993, pp. 98–104, IEEE, XP000370465.

Pickett, J.K., et al., "Enhanced Superscalar Hardware: The Schedule Table", 15 Nov. 1993, pp. 636–644, IEEE, XP000437401.

Sohi, G.S., "Instruction Issue Logic for High–Performance, Interruptible, Multiple, Functional Unit, Pipelined Computer", 1 Mar. 1990, pp. 349–359, IEEE Transactions on Computers, vol. 39, No. XP000103439.

Capozzi, A.J., et al., "Non–Sequential High–Performance Processing", Oct. 1984, pp. 2842–2844, IBM Technical Disclosure Bulletin, XP002024299.

*Primary Examiner*—Kevin J. Teska
*Assistant Examiner*—Russell W. Frejd
*Attorney, Agent, or Firm*—Skjerven, Morrill, MacPherson, Franklin & Friel LLP; Ken J. Koestner

[57] ABSTRACT

System management mode (SMM) is utilized, despite operating system security measures, by furnishing a polled interface for SMM. When an application program is to make an XBIOS call, the application program posts an XBIOS request in a storage. SMM is activated periodically by a timer and, during activation, checks the storage for XBIOS requests. When an XBIOS request is posted, SMM processes the request XBIOS command and leaves a response from the XBIOS call in the storage. The application program, which continually loops, monitors the storage and detects replacement of the XBIOS request by the XBIOS result to realize completion of an XBIOS call.

14 Claims, 7 Drawing Sheets

OPERATION SYSTEM INDEPENDENT POLLED INTERFACE FOR EXTENSION BIOS (XBIOS) OPERATIONS

BACKGROUND OF THE INVENTION

1. Field of the Invention

The present invention relates to computer operating systems. More specifically, the present invention relates to XBIOS software and an XBIOS operating method for managing system resources that are protected or secured.

2. Description of the Related Art

Various computer operating systems, for example the Windows NT™ operating system, manage system resources by emulating various resource access operations. Resources managed by emulation include input/output ports, memory and CMOS memory for storing configuration and device information. For example, an operating system may emulate an input/output operation to various protected locations by recording a value written to an input/output port location but never actually performing the input/output transfer.

One problem with such operating system resource management is that various critical high-level software/hardware interface functionality is prohibited. Computer systems often implement this functionality in an extension basic input output system (XBIOS).

In one example, the XBIOS utilizes a system management interrupt (SMI) to support utility functionality such as an extended control panel. The Windows NT™ operating system prevents the XBIOS from detecting or responding to the SMI.

In another example, the XBIOS performs power management by reading and writing the CMOS memory. The Windows NT™ operating system emulates the CMOS memory to prohibit access to the CMOS memory by the XBIOS.

XBIOS utilities that allow a computer user to monitor the charge status of the battery or to control various system operating events, such as power management timeouts, are essentially deactivated by a "secure" operating system, like the Windows NT™ operating system.

Operating systems implement these security and protection features using various different techniques. One technique is to prevent and trap input/output calls to designated protected locations. In another technique, the operating system may move the location of the basic input output system (BIOS) in a manner that application software is unable to locate the XBIOS. Therefore, the application software is prevented from activating XBIOS functionality.

Operating systems that prohibit high-level software/hardware interface functionality, such as Windows NT™, exercise this prohibition by emulating system BIOS and system management mode (SMM) accesses, thus preventing system BIOS and SMM calls.

What is needed is a technique that enables execution of application programs implementing a high-level system functionality without restriction by the operating system. What is needed is a method of providing XBIOS functionality without making a call through the system BIOS and without making a direct system management mode (SMM) call.

SUMMARY OF THE INVENTION

In accordance with the present invention, system management mode (SMM) is utilized, despite operating system security measures, by furnishing a polled interface for SMM. When an application program is to make an XBIOS call, the application program posts an XBIOS request in a storage. SMM is activated periodically by a timer and, during activation, checks the storage for XBIOS requests. When an XBIOS request is posted, SMM processes the requested XBIOS command and leaves a response from the XBIOS call in the storage. The application program, which continually loops, monitors the storage and detects replacement of the XBIOS request by the XBIOS result to realize completion of an XBIOS call.

In accordance with an embodiment of the present invention, a utility program operates on a computer system having a processor, a storage and a timer. The utility program includes a timer activating routine which enables the timer and sets a periodic timer interrupt interval to generate timer interrupts and an extension BIOS (XBIOS) module including a plurality of XBIOS routines. An XBIOS routine is activated by an XBIOS call. The utility program further includes a continuously-looping application program which writes an activation pattern invoking an XBIOS request to the storage and a system management operating mode (SMM) which is activated by a timer interrupt. The SMM includes a routine for checking the activation pattern in the storage and activating an XBIOS routine via an XBIOS call when the activation pattern is a designated pattern. The XBIOS routine writes a response to the XBIOS call to the storage.

Many advantages are achieved by the described program and method. One advantage is that the described system supplies valuable low-level functionality with limited resource expenditure while maintaining reaction times. Another advantage is that the described pattern coding is sufficiently specific to the precise XBIOS operations invoked that the security of a secured operating system is not compromised while useful functions are allowed to operate which would otherwise be defeated by the operating system.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE PREFERRED EMBODIMENTS

Figure 1:
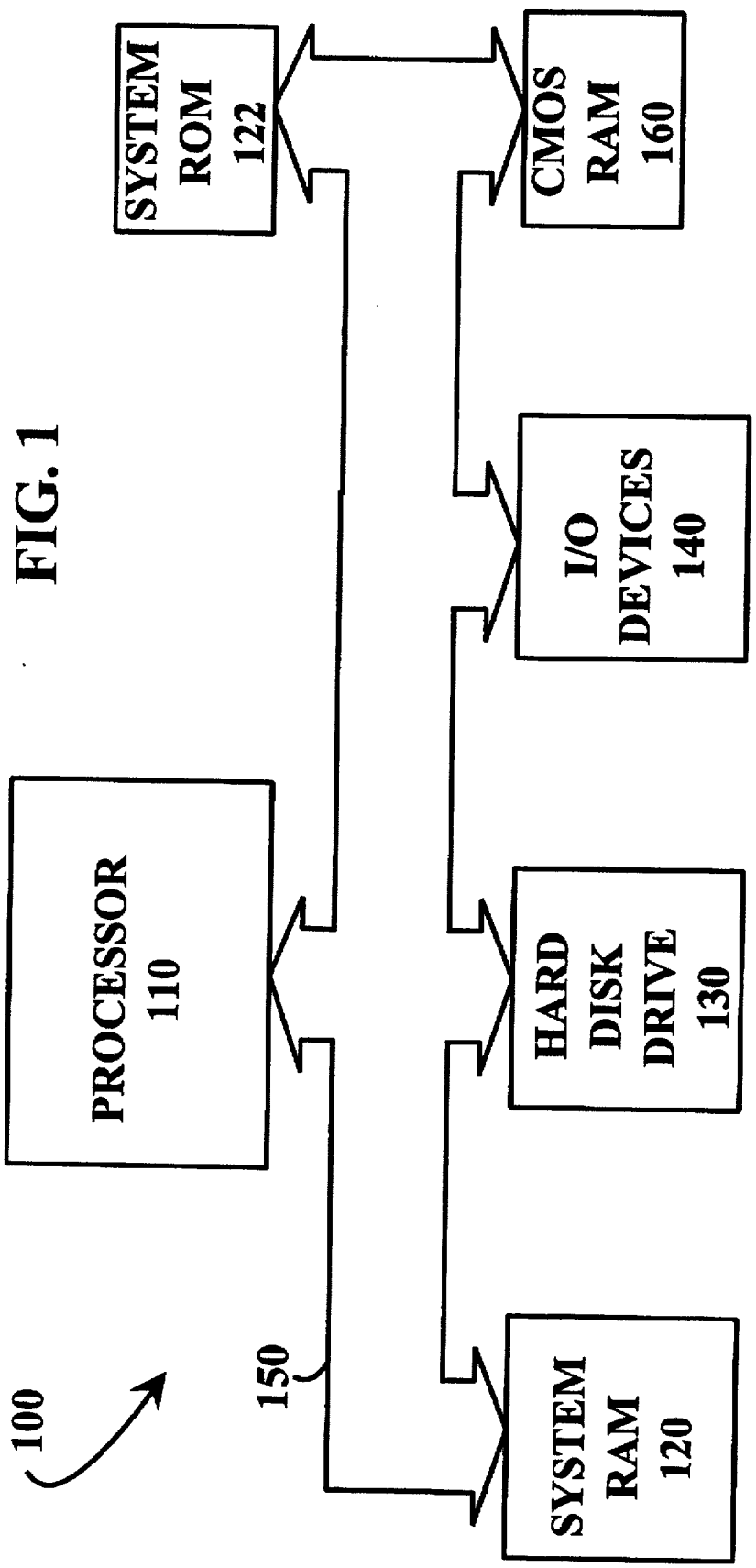
FIG. 1 is a block diagram which depicts computer system hardware upon which a system for implementing an operating system independent method for implementing an independent polled interface for extension BIOS (XBIOS) operations.

Referring to FIG. 1, a computer system 100 is shown which runs a system for creating an operating system independent environment for executing utility programs. The computer system 100, typically a personal computer, includes a processor 110, a system random access memory (RAM) 120, a system ROM 122, a hard disk drive 130 and various other input/output devices 140. These system components communicate via a bus 150 which includes data, address and control lines. A CMOS clock nonvolatile RAM 160, which is connected to the processor 110 via the bus 150, is typically utilized to store information even when power to the computer system 100 is interrupted. Program instructions that make up the system for creating an operating system independent environment are stored in a storage device such as the hard disk drive 130 or the system ROM 122 connected to the processor 110. The processor 110, for example an x86 processor such as a 486, 586 or Pentium□ processor, executes the computing operations of the computer system 100.

Figure 2:
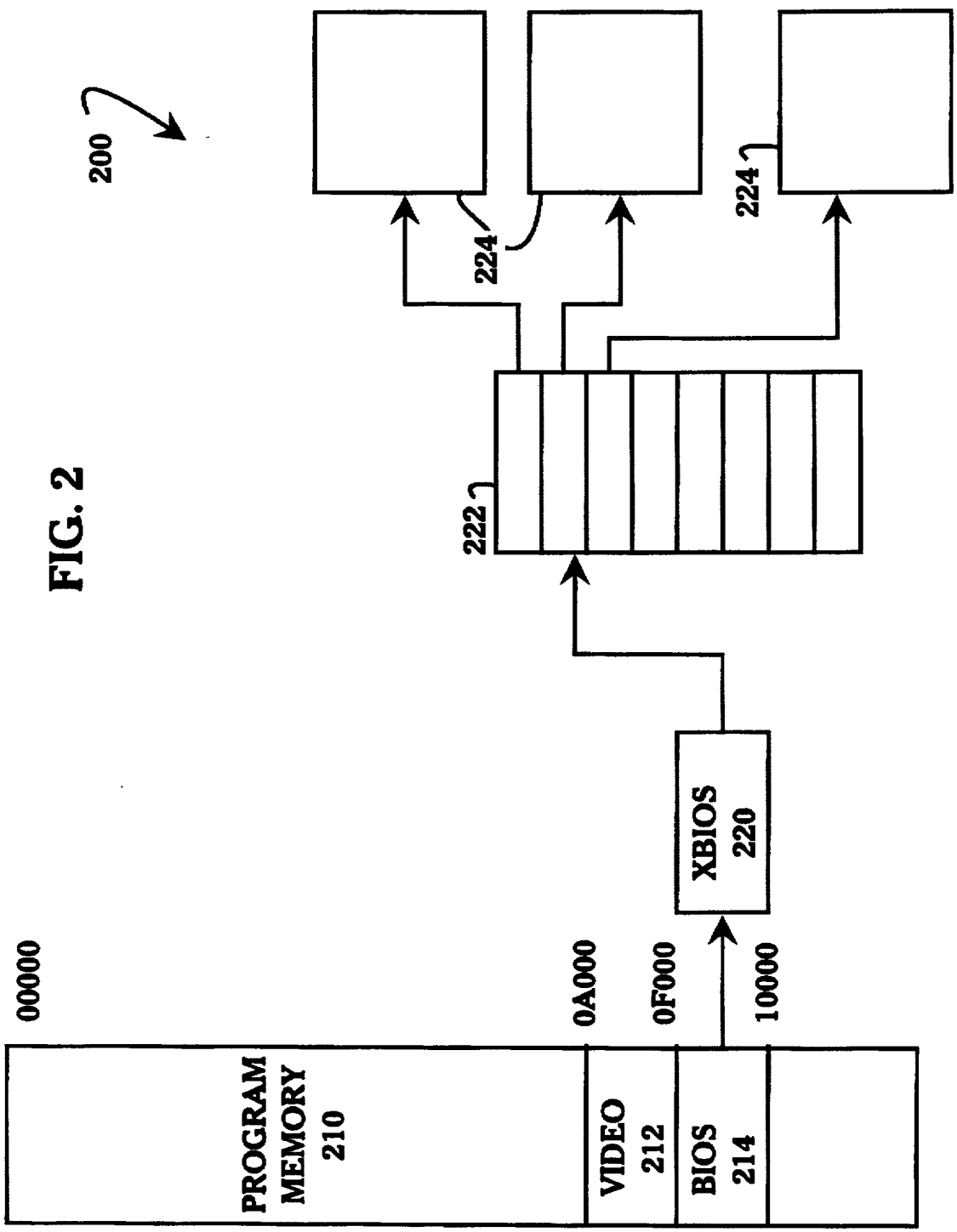
FIG. 2 is a pictorial illustration of a memory map of memory in the computer system shown in FIG. 1.

Referring to FIG. 2, a memory map 200 of a computer system shows a program memory 210 having a starting address of 0000H, a video memory 212 with a starting address of 0A00H and a BIOS memory 214 located at addresses 0F000H to 0FFFFH. A basic input output system (BIOS) is the part of an operating system that customizes the operating system to a specific computer. The BIOS forms the lowest-level interface to common devices such as a system clock, hard disk and display, for example. The BIOS memory 214 includes information for interfacing to an extension basic input output system XBIOS 220.

The XBIOS 220 extends BIOS functionality of a computer system. In particular, various computer system integrators include an XBIOS memory 220 to furnish extended features to the standard BIOS functionality. Some of these features are included to facilitate usage of programs for the benefit of the computer user. Specifically, these features may include management of a battery icon for displaying battery life remaining of a rechargeable battery and operating a control panel for setting power management parameters. The features also include WinCPL, an application that enables execution of power management functions without invoking a system setup operation. WinCPL controls various security operations such as setting of a password, control of speaker volume, enablement of simulated key click, modification of display parameters such as brightness and contrast. The features further include an asset tag utility that allows a computer user to assign an asset tag for identifying a particular computer system and to read the assigned asset tag. The asset tag is useful for identifying and inventory of computer systems for accounting purposes and the like. Still another feature is a monitor.exe executable file that controls video monitor parameters such as video bias, monitor refresh rate and the like.

The XBIOS 220 stores a plurality of pointers that point to entries in an XBIOS table 222. The XBIOS table 222 includes a plurality of pointers to memory addresses for various assigned application program functions 224. Each individual XBIOS program function 224 has a separate entry in the XBIOS table 222 and a separate entry point that is stored in the XBIOS table 222.

In one mode of operation, the program code in the XBIOS 220 operates by transferring operation identifiers and parameters to the CMOS memory 160 and performing an input/output instruction that evokes a SMI# signal. The SMI# signal is a signal for activating a system management mode (SMM) of operating. When a processor 110 recognizes a SMI# signal on an instruction boundary, the processor 110 waits for all store operations to complete. The processor 110 then saves the processor register state to a region in memory called a system management RAM (SMRAM) space and begins to execute a SMM handler routine. The SMI# interrupt has a greater priority than debug exceptions and external interrupts so that SMM processing preempts debug and external interrupt conditions. Subsequent SMI# and non-maskable interrupt (NMI) requests are not acknowledged while the processor is operating in system management mode.

System management mode (SMM) processing is conventionally performed by a technique in which software routines write a defined pattern or code to a specific defined SMI input/output I/O location. A pattern is defined to be suitably complex that an incorrect and unsuitable pattern is not inadvertently set. Generally, the patterns encode a sufficient amount of operational information that this level of complexity is easily achieved. Advantageously, the pattern coding is sufficiently specific to the precise XBIOS operations invoked that the security of a secured operating system is not compromised while useful functions are allowed to operate which would otherwise be prohibited by the operating system. The writing of this pattern to the SMI I/O location generates an SMI# signal, evoking a system management mode interrupt. In "secured" operating systems such as Windows NT#, direct write operations to the SMM I/O location are prohibited. This prohibition is enforced by the operating system which intercepts and emulates the I/O call. The operating system typically diverts the I/O instruction and information accompanying the instruction to an unknown location, fails to evoke the SMI# interrupt or SMM routine, and returns a failure code, perhaps informing that the addressed I/O location does not exist. Thus, if an attempt is made to read data from the SMM I/O location, a code is returned that apparently is an "empty bus notification" error code (0FFH).

Figure 3:
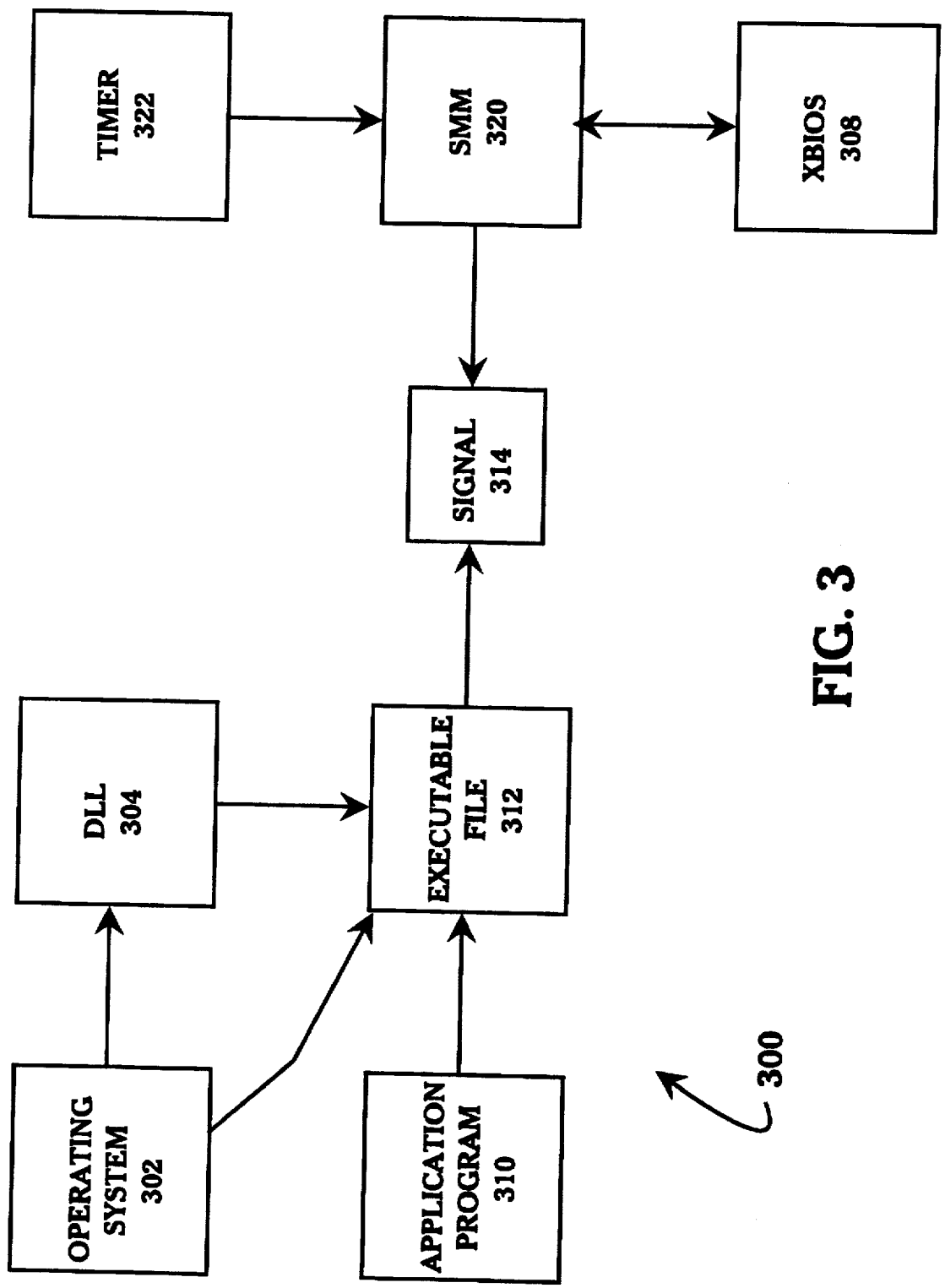
FIG. 3 is a block diagram which depicts various functional blocks of a software system that supplies full XBIOS functionality without voiding the security of the operating system.

Thus, although the XBIOS functionality of a computer system can be supplied without compromising security or system integrity, the Windows NT™ operating system prevents such functionality. A secure operating system seeks a level of security that meets governmental and military specifications for very secure computer system operating environments. Referring to FIG. 3, a block diagram is shown which depicts the operations of a software system 300 that supplies full XBIOS functionality without voiding the security of the operating system. The software system 300 furnishes a polled interface for system management mode (SMM) operation. In a polled interface, an application program 310 does not attempt to invoke an SMI# interrupt, but instead the application program 310 sets or posts a signal 314 which is interrogated by an SMM operation 320. The SMM operation 320 is activated independently of the application program 310 operation. Specifically, system management mode (SMM) operations 320 are evoked periodically, for example, by activating periodic timed interrupts using a standard timer 322.

In the software system 300, an application software program 310 is prepared for execution using dynamic linking capabilities of a target operating system 302, such as Windows NT™, so that the dynamic linking environment includes a link step and a program loading step governed by the operating system 302. The linker scans a set of dynamic link libraries (DLL) 304. Some of the libraries include runtime support code that is linked into an executable file 312. Other libraries, called import libraries, contain references to functions that are not fully resolved until the operating system 302 loads the program executable file 312 for execution. A linker in the operating system 302 scans an import library and embeds a target module name and a numeric entry point into the executable file 312. When the operating system 302 loads the executable file 312 for execution, the operating system 302 replaces these references with addresses that are valid for usage in function calls. A dynamic link library (DLL) is a module that satisfies these references by dynamic linking. A DLL declares a set of entry points that satisfy external references.

Various libraries of the dynamic link libraries (DLL) 304 include operational code for making an XBIOS call which posts an XBIOS request, thereby initiating an XBIOS routine 308. The application program 310, which utilizes one or more XBIOS calls for various low-level functionality, assigns a data storage element for handling data. Typically, a known location in memory is assigned by the application program 310 for posting the signal 314 by storing information designating a particular system management function to be performed. However, some secure operating systems, such as Windows NT™, do not allow access or assignment of a particular known location in memory. Therefore in the software system 300, general purpose registers of the processor 110 are assigned to post the signal 314 and store the information designating a requested particular system management function and, upon servicing by the SMM operations 320 and XBIOS routines 308, to store a response of SMM/XBIOS processing. In some embodiments, the software system 300 assigns 16-bit general purpose registers such as AX, BX, CX and DX for storing patterns for evoking SMM operations 320 and XBIOS routines 308. In other embodiments, 32-bit registers, such as EAX, EBX, ECX and EDX are used to store activation patterns.

Figure 4:
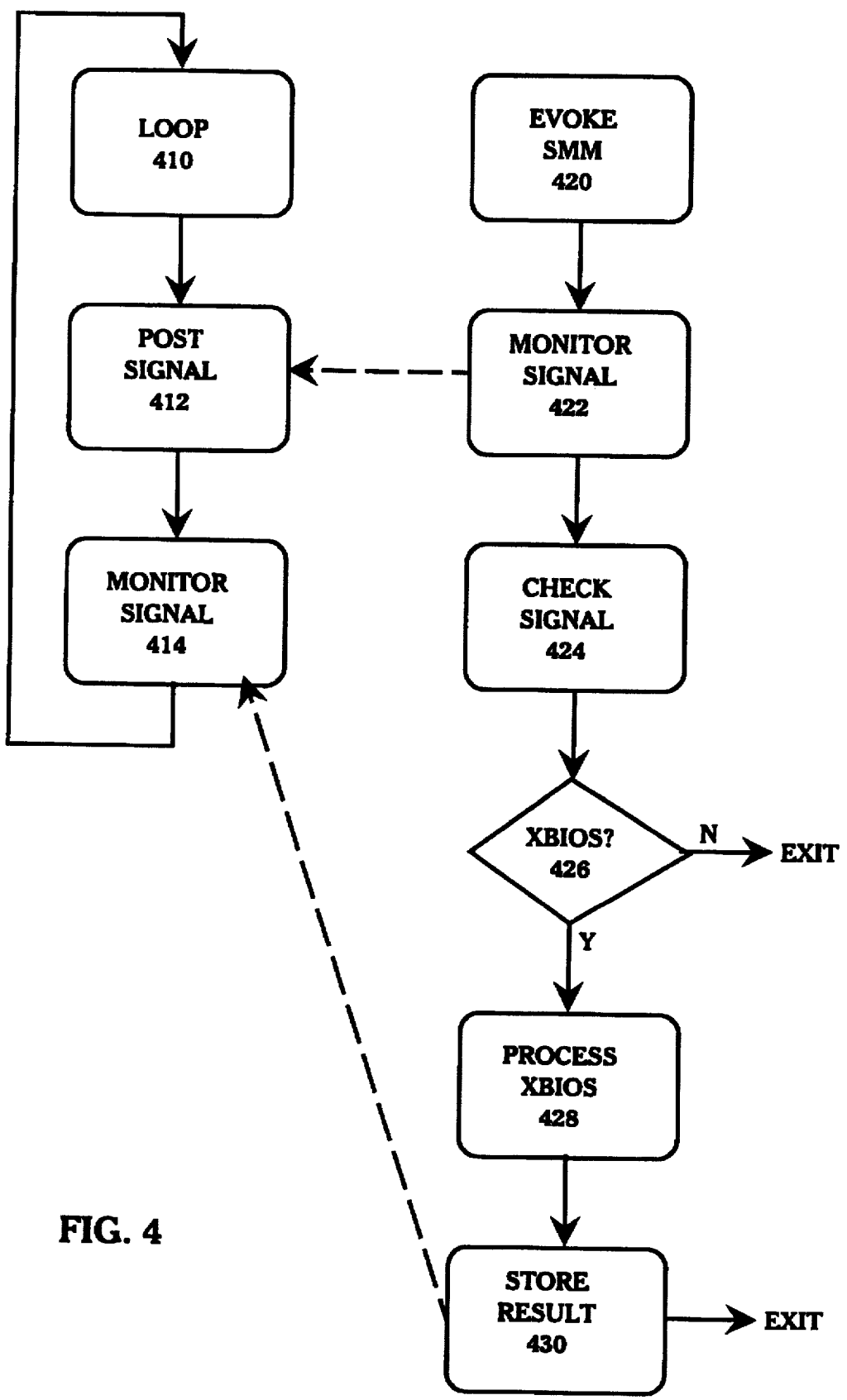
FIG. 4 is a flow chart which illustrates operations executed by the software system functional blocks shown in FIG. 3.

Referring to the flow chart of FIG. 4 in conjunction with the block diagram shown in FIG. 3, operations of the various functional blocks of the software system 300 are shown. The executable file 312 of the application program 310 continuously operates in a repeating loop 410. In an instance for which the application program 310 includes a code indicative of an XBIOS request, the signal 314 is posted in step 412 by writing a code into a general purpose register.

The SMM operations 320 are periodically evoked in step 420 by interrupts generated by the standard timer 322. As system management mode (SMM) operations 320 are periodically evoked, the SMM operations 320 monitor the general purpose registers assigned to the interrupted application program 310 in step 422. Upon entry into the SMM 320, hardware (not shown) in the processor 110 saves the register state of the interrupted application program 310 in a part of system management RAM (SMRAM) called the SMM state dump record. The SMM operations 320 then check the registers in step 424 to determine whether a pattern that activates a function in SMM and XBIOS is encoded in a general register. If a general purpose register stores a pattern representing a request for a particular system management function as determined in logic step 426, the SMM operation 320 processes the XBIOS command that is designated by the pattern in the general purpose registers in step 428. The designated XBIOS routine 308 generates a resultant response and stores the response in the general purpose registers in step 430. When the SMM operation 320 terminates, processing returns to the interrupted application program 310 which determines whether the content of the general purpose registers has changed in step 414. The application program 310, operating in a loop, does not change the general purpose registers but rather waits for the registers to change through the operation of external hardware or software processes, such as SMM operations 320.

If the content of the general purpose registers has not changed, the application program 310 has not been polled by the SMM operation 320 and continues to loop, awaiting SMM operation 320 servicing. If the application program 310 determines that the general purpose register value has changed, the application program 310 concludes that the combination of the SMM operation 320 and the XBIOS routine 308 has responded. While the application program 310 continues to loop, the processor 110 may respond to an interrupt and momentarily execute an operating system function. In addition, other application programs may be activated and execute occasionally for a short time. Meanwhile, the timer 322 continues to generate periodic interrupts which activate SMM operations 320. In one embodiment of the software system 300, the timer 322 generates interrupts at one second time intervals so that the application program 310 is interrupted once per second, allowing system management mode (SMM) 320 to execute with no interference from the security and protection functionality of the operating system 302.

The operating system 302 does not permit the application program 310 to access the SMM operations 320 or an XBIOS routine 308. However, the operating system 302 does not hinder the SMM operations 320 from accessing the general purpose registers and the patterns set therein by the application program 310. Furthermore, the operating system 302 does not prevent the SMM operations 320 from activating the XBIOS routine 308. Therefore, usage of the polled interface circumvents the security function of the operating system 302.

In this manner, the processor 110 essentially runs two or more programs at one time including the application program 310 and the system management mode (SMM) 320. The application program 310 at some time requests service by the SMM 320. The SMM 320 checks to determine whether the application program 310 needs a service to be performed. The software system 300 alternates between operating system 302 operations and application software operations. The software system 300 continuously loops, awaiting additional servicing by the SMM operations 320 whenever an activating pattern is stored by the application program 310 in the general purpose registers under control of the application program 310.

Various software system embodiments are implemented differently to seek advantageous operating characteristics and to avoid disadvantageous operating conditions. For example, the first described embodiment of a software system 300 operates on parameters and response values returned by SMM operations that may be larger than the capacity of the general registers.

In another example, the polling period may be established in the first embodied software system 300 which is too long in duration so that extended looping by the application program 310 results in inefficient operation. For example, activation of the SMM operations 320 once per second may impose an excessive SMM overhead upon the processor 110 so that SMM accesses may be reduced to once every five or ten seconds. As a result, the application program 310 loops for a disproportionate time awaiting a response from the SMM 320. This extended waiting time may be excessive for performing certain functions. For example, if ten seconds of computer time are consumed while awaiting SMM activation to execute a function such as a battery status check, an extremely high overhead is imposed. One technique for reducing this overhead is to reduce the period of the timer 322 after a first polled SMI# interrupt occurs so improve response time. When periodic polled XBIOS calls terminate, the application program 310 sets the period of the timer 322 to the initial duration.

Figure 5:
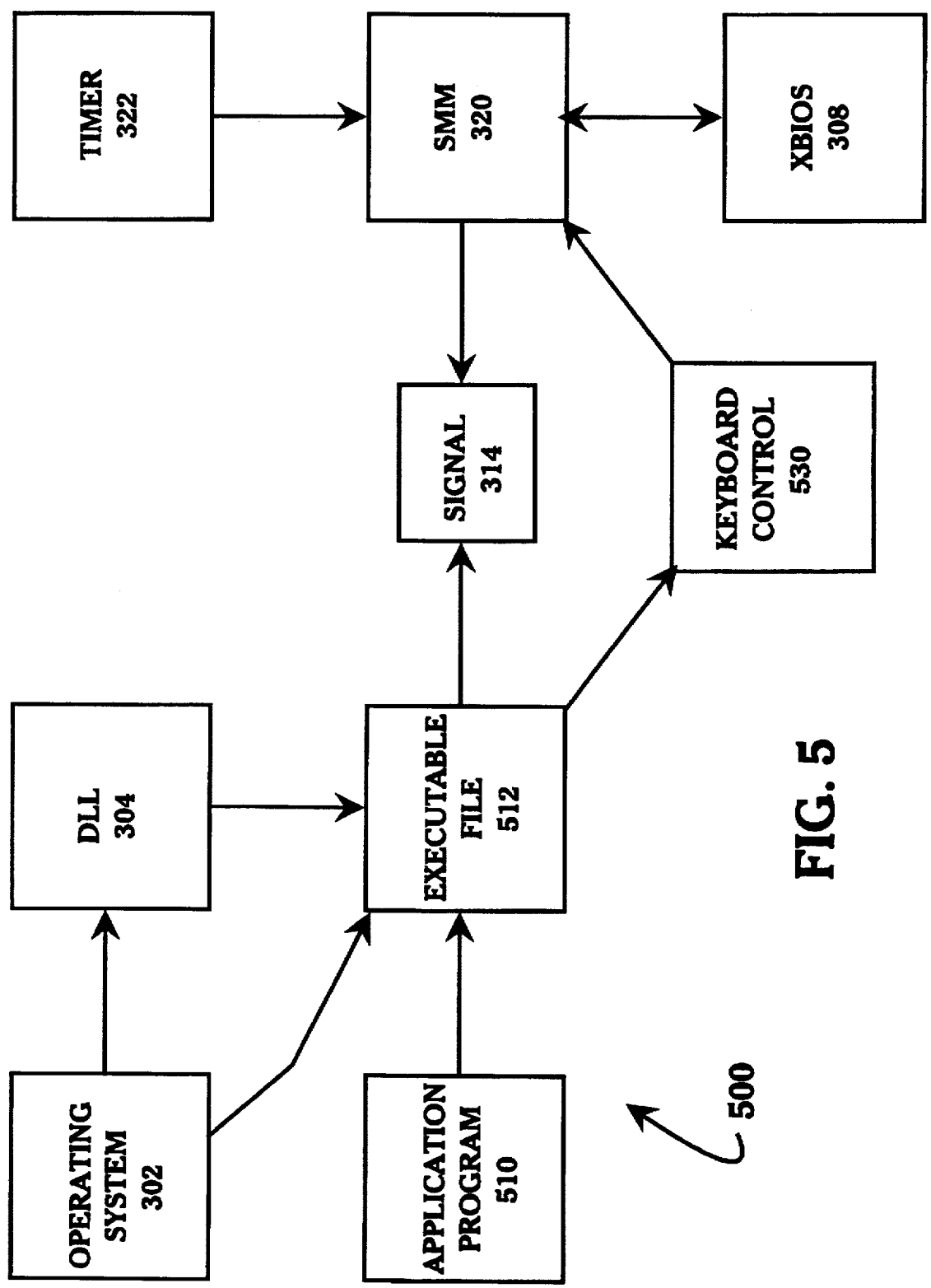
FIG. 5 is a block diagram which illustrates an additional embodiment of a software system that improves potential response time of system management mode (SMM) operations.

Another technique for reducing SMM overhead is to allow the application program 310 to set patterns in the registers to invoke SMM operations 320 and then to indirectly trigger SMM operations 320. FIG. 5 is a block diagram which illustrates an additional embodiment of a software system 500 that improves potential response time of system management mode (SMM) operations 320. In software system 500, an application program 510 evokes an SMI# interrupt by sending a legal but innocuous sequence of keyboard commands that cause a keyboard controller 530 to issue a SMI# interrupt. One example of such a sequence of keyboard commands is a keyboard interface disable command (0ADH) followed by a keyboard interface enable command (0AEH). The keyboard controller 530 responds to this sequence by issuing the SMI#interrupt while the keyboard does not change function or state.

The keyboard controller 530 monitors the sequence of keyboard commands and, if the sequence of keyboard commands is indicative of an SMI# request, the keyboard controller 530 immediately evokes an SMI# interrupt. The software system 500 continues to operate in the continuous loop but the keyboard controller 530 immediately evokes an SMI# upon triggering by the application program 510. Typically, the software system 500 controls SMM operations 320 via the continuous control loop to service routine periodic functions. Immediate invocation of the SMM 320 via keyboard commands is generally used only for infrequently occurring but time-critical operations.

Figure 6:
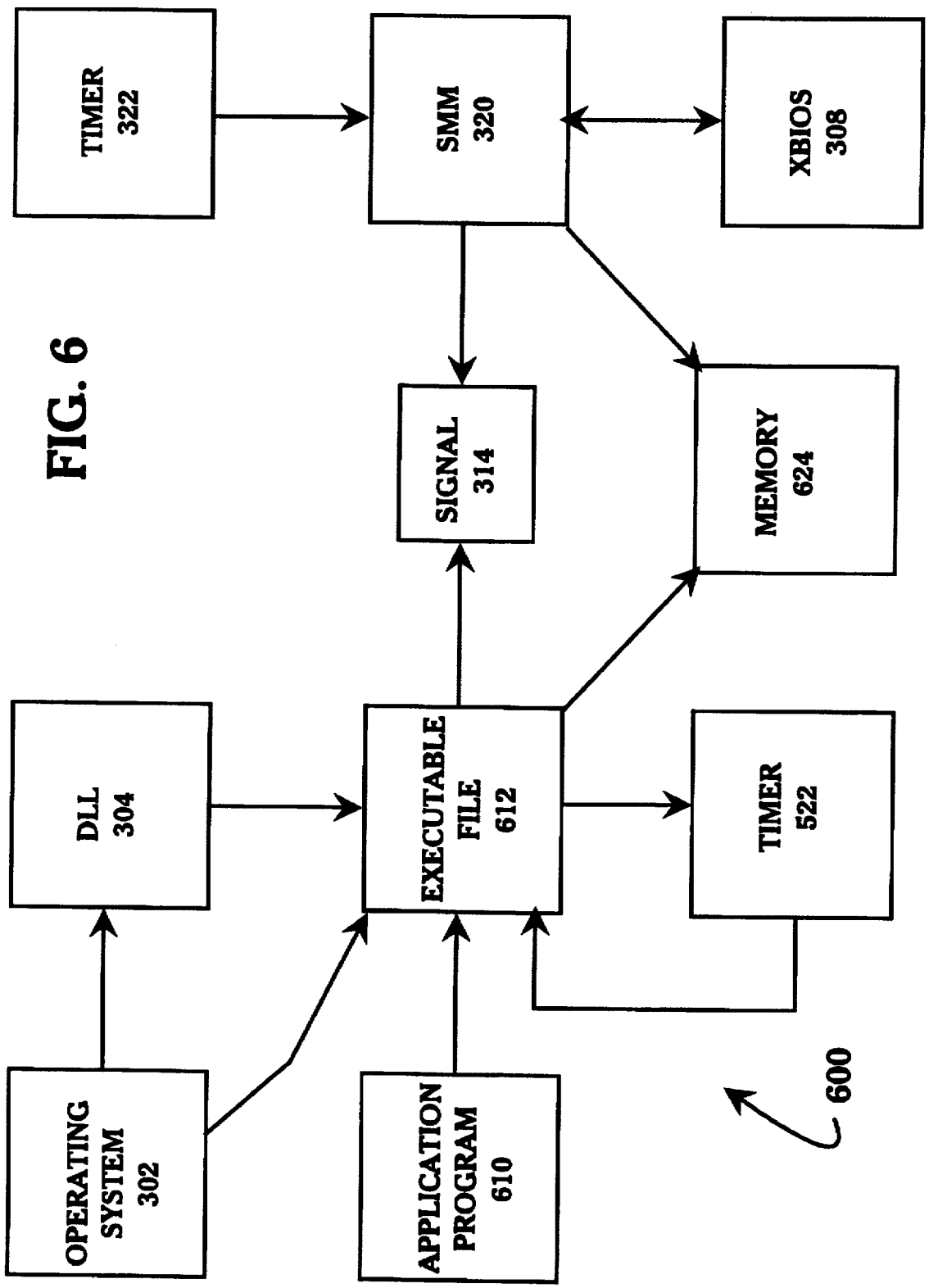
FIG. 6 is a flow chart which illustrates a further additional embodiment of a software system that improves potential response time of system management mode (SMM) operations.

However, some operating systems do not allow write operations to the keyboard. An alternative embodiment of a software system 600 is illustrated in the flow chart shown in FIG. 6. The system management mode (SMM) 320 is the same in function, structure and execution in the various software system embodiments 300, 500 and 600. An application program 610 operating within the software system 600 performs additional operations to reduce operating overhead. After the application program 610 executes various suitable application operations, the application program 610 stores a predetermined known pattern. The application program 610 then sets a timer 622 to a predetermined timer interval and suspends operation pending a timer interrupt. So long as no other application programs or operating system functions are active, the processor 110 and operating system 302 also suspend operations so that system resources are conserved. When the timer interval expires, the timer 622 generates an interrupt signal that activates the application program 610. The activated application program 610 checks the stored pattern. If the pattern has not changed, the SMM 320 has not responded to the XBIOS request of the application program 610 so the application program 610 continues to loop. Otherwise, the SMM 320 has responded to the XBIOS request so that the application program 610 returns to execution of application functions.

One difference between the software system 600 and previously discussed software systems 300 and 500 is that the application program 610 does not store the predetermined known pattern into a general purpose register. The application program 610 sets the timer 622 and awaits a timer interrupt. However, the operating system 302 detects that the timer 622 is set, deactivates the application program 610 awaiting the pending timing interrupt and, in response to these events, stores the general registers in another location so that the general registers can be used for other processing that may take place during reactivation of the application program 610. With the pattern saved in a location that is unknown to the SMM 320 and XBIOS routine 308, information for controlling the polled interface is unavailable. To solve this problem, the software system 600 establishes a known location in memory 624 that is protected against access by software other than the application program 610, the SMM operation 320 and the BIOS routine 308.

Figure 7:
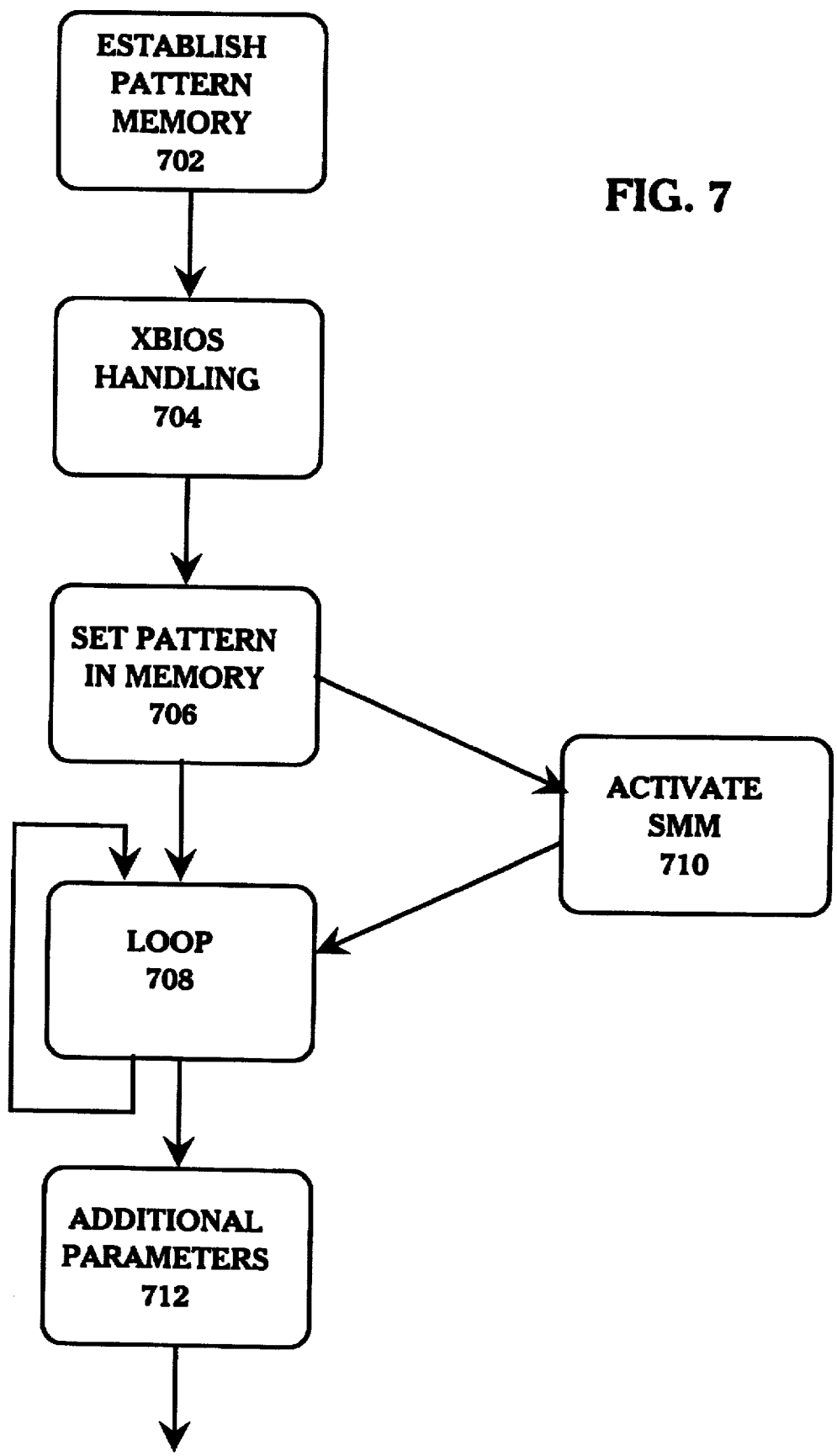
FIG. 7 is a flow chart that illustrates operation of the software system and application program shown in FIG. 6 to interface with the SMM and XBIOS.

Referring to FIG. 7, a flow chart illustrates the operation of the software system 600 and application program 610 to interface with the SMM 320 and XBIOS 308. In a preliminary step 702, a known region in memory is established for saving the pattern. The application program 610 establishes communication with the SMM 320 in step 704 by executing an application program which is similar in function to the application program 310 described previously with reference to FIG. 3. The application program 310 sets a pattern indicative of a suitable XBIOS function stored in a general purpose register and continuously loops awaking servicing by the SMM 320. After the SMM operation 320 responds, the application program 610 acquires a memory location 624, sets the pattern in the protected memory location 624 in step 706 and identifies the memory location 624 by performing a write operation to a general purpose register. In particular, the application program 610 writes information into the general purpose register including a function identifier (ID) to evoke an XBIOS call and a designation of the memory location 624 expressed as an offset within a page and a randomly generated pass key. A page size block is reserved and preset with appropriate XBIOS parameters at the offset location specified in the general purpose registers. In step 708, the application program 610 loops waiting for servicing by the SMM 320. In step 710, the SMM 320 is activated, accesses the general purpose registers and detects the XBIOS function ID. Upon detection of the XBIOS function ID, the SMM 320 scans physical memory seeking the pass key at the specified offset. If the SMM 320 finds the pass key, the SMM 320 seeks an XBIOS call structure following the pass key. If the XBIOS call structure is found and validated, SMM 320 processes the XBIOS request in memory and XBIOS 308 services the polled interface, establishing the memory location 624 from the designation stored in the general purpose register. The XBIOS routine 308 returns results by writing the results into the memory location 624.

According to this method, extended looping by the application program 610 takes place only during the first access. Thereafter, when the memory location 624 is established for both the application program 624 and the XBIOS routine 308, extended looping and its inherent overhead is no longer employed. In step 712 the software system 600 is further initialized as the XBIOS routine implements initialization parameters specified by the application program 610 which designate, for example, the polling frequency and the function to perform at a particular selected time.

The software system 600 advantageously overcomes high resource usage and slow reaction times of other software systems. The software system 600 is first initialized. Some time and system resources are consumed during initialization of the polling interface but after initialization is complete only a small amount of system resources are expended.

While the invention has been described with reference to various embodiments, it will be understood that these embodiments are illustrative and that the scope of the invention is not limited to them. Many variations, modifications, additions and improvements of the embodiments described are possible. For example, the embodiments are described as systems for circumventing various protection and security features of the Windows NT™ operating system. The invention is applicable with reference to other operating systems employing similar security measures. Furthermore, the described embodiments discuss the usage of general purpose registers for communicating the polling signal. In other embodiments, other various types of temporary storage cells are applicable so long as these cells are not overwritten by the operating system.

What is claimed is:

1. A utility program operating on a computer system having a processor, a storage and a timer, the utility program comprising:

a timer activating routine which enables the timer and sets a periodic timer interrupt interval to generate timer interrupts;

an extension BIOS (XBIOS) module including a plurality of XBIOS routines, an XBIOS routine being activated by an XBIOS call;

a continuously-looping application program which writes an activation pattern invoking an XBIOS request to the storage;

a system management operating mode (SMM) which is activated by a timer interrupt, the SMM including a routine for checking the activation pattern in the storage and activating an XBIOS routine via an XBIOS call when the activation pattern is a designated pattern, the XBIOS routine writing a response to the storage.

2. A utility program according to claim 1 wherein the storage includes a general purpose register.

3. A utility program according to claim 1 wherein:
   the computer system further includes a keyboard; and
   the application program further includes a routine for writing a sequence of keyboard commands that evoke an interrupt activating the SMM.

4. A utility program according to claim 1 wherein:
   the utility program further includes a reserved memory page block that stores XBIOS parameters at a designated offset within the page block;
   the application program writes an activation pattern to a register and the activation pattern includes a function ID, the designated offset within the reserved memory page block and a randomly generated pass key; and
   the SMM includes:
      a routine for detecting a function ID in the register;
      a routine responsive to detection of the function D for scanning a physical memory to find the pass key;
      a routine responsive to a found pass key for scanning the physical memory to find an XBIOS call structure; and
      a routine responsive to a found XBIOS call structure for processing the XBIOS request.

5. A utility program according to claim 1 wherein the SMM further includes:
   a routine responsive to the activation pattern being the designated pattern for reducing the periodic timer interrupt interval;
   a routine for detecting termination of XBIOS requests by the application program; and a routine responsive to detection of termination of XBIOS requests for resetting the periodic timer interrupt interval to the original periodic timer interrupt interval.

6. A utility program according to claim 1 wherein:
   XBIOS calls are implemented in the application program via a dynamic link library (DLL).

7. A utility program operating on a computer system having a processor and a storage, the utility program comprising:

an extension BIOS (XBIOS) module including a plurality of XBIOS routines, an XBIOS routine being activated by an XBIOS call;

a continuously-looping application program which writes an activation pattern to the storage;

a system management operating mode (SMM) which periodically polls the application program to determine when the activation pattern is written to storage, the SMM including a routine for checking the activation pattern in the storage and activating an XBIOS routine via an XBIOS call when the activation pattern is a designated pattern, the XBIOS routine writing a response to the storage.

8. A utility program according to claim 7 wherein the storage includes a general purpose register.

9. A utility program according to claim 7 wherein:
   the computer system further includes a keyboard; and
   the application program further includes a routine for writing a sequence of keyboard commands that evoke an interrupt activating the SMM.

10. A utility program according to claim 7 wherein:
    the utility program further includes a reserved memory page block that stores XBIOS parameters at a designated offset within the page block;
    the application program writes an activation pattern to a register and the activation pattern includes a function ID, the designated offset within the reserved memory page block and a randomly generated pass key; and
    the SMM includes:
       a routine for detecting a function ID in the register;
       a routine responsive to detection of the function ID for scanning a physical memory to find the pass key;
       a routine responsive to a found pass key for scanning the physical memory to find an XBIOS call structure; and
       a routine responsive to a found XBIOS call structure for processing the XBIOS request.

11. A utility program according to claim 7 wherein:
    the computer system further includes a timer;
    the utility program further includes a timer activating routine which enables the timer and sets a periodic timer interrupt interval to generate timer interrupts; and
    the SMM includes:
       a routine responsive to the activation pattern being the designated pattern for reducing the periodic timer interrupt interval;
       a routine for detecting termination of XBIOS requests by the application program; and
       a routine responsive to detection of termination of XBIOS requests for resetting the periodic timer interrupt interval to the original periodic timer interrupt interval.

12. A utility program according to claim 7 wherein:
    XBIOS calls are implemented in the application program via a dynamic link library (DLL).

13. A method of indirectly accessing XBIOS functionality of a processor that is protected by an operating system that prohibits direct system BIOS calls and direct system management mode (SMM) calls, the method comprising the steps of:

simultaneously executing an application program and SMM operations by multiprogramming, the application program executing a plurality of instructions in a loop, the SMM being activated periodically by a timer;

during application program execution, posting an XBIOS request in a storage in response to an application program instruction indicative of the XBIOS request;

during SMM operations, checking the storage to detect an XBIOS request during SMM activation; when an XBIOS request is posted, processing the XBIOS command; upon termination of the XBIOS command processing, writing an XBIOS command response to the storage.

14. A method according to claim 13, further comprising the steps of:

during application program execution, monitoring the storage; and detecting replacement within the storage of the XBIOS request by the XBIOS result to realize completion of the XBIOS call.

* * * * *